(12) United States Patent
Hagel

(10) Patent No.: US 10,556,264 B2
(45) Date of Patent: Feb. 11, 2020

(54) DEVICE AND METHOD FOR TRANSFERRING A COMPONENT AND TOOL SYSTEM

(71) Applicant: HSF Automation GmbH, Gruenkraut-Gullen (DE)

(72) Inventor: Martin Hagel, Gruenkraut-Gullen (DE)

(73) Assignee: HSF Automation GmbH, Grünkraut-Gullen (DE)

( * ) Notice: Subject to any disclaimer, the term of this patent is extended or adjusted under 35 U.S.C. 154(b) by 0 days.

(21) Appl. No.: 14/983,478

(22) Filed: Dec. 29, 2015

(65) Prior Publication Data
US 2016/0228937 A1    Aug. 11, 2016

Related U.S. Application Data

(63) Continuation of application No. PCT/EP2014/063865, filed on Jun. 30, 2014.

(30) Foreign Application Priority Data

Jun. 30, 2013  (DE) ........................ 10 2013 010 804

(51) Int. Cl.
*B21D 43/10*  (2006.01)
*B65G 47/90*  (2006.01)
*B21D 43/05*  (2006.01)

(52) U.S. Cl.
CPC ........... *B21D 43/105* (2013.01); *B21D 43/05* (2013.01); *B65G 47/901* (2013.01); *B65G 47/905* (2013.01)

(58) Field of Classification Search
CPC ...... B21D 43/05; B21D 43/105; B21D 43/10; B23Q 1/60; B25J 18/02; B65G 47/91; B65G 47/901; B65G 47/905
See application file for complete search history.

(56) References Cited

FOREIGN PATENT DOCUMENTS

| EP | 0930110 A2 | 7/1999 | |
| FR | 2921578 | * 1/2010 | ............. B25J 9/026 |

OTHER PUBLICATIONS

English translation of First Office Action received in connection with related Chinese Patent Application No. 2014800355793, 6 pages.

* cited by examiner

*Primary Examiner* — Ronald P Jarrett
(74) *Attorney, Agent, or Firm* — Dorsey & Whitney LLP

(57) ABSTRACT

A device comprises a frame, a traversing unit with a first drive unit for moving the traversing unit with respect to the frame and a telescopic unit. The telescopic unit is equipped with a base movable along a first travel path with respect to the traversing unit, a support beam movable along a second travel path with respect to the base and a sliding carriage for transferring the component, the sliding carriage being movable along a third travel path with respect to the support beam, a second drive unit and a transmission. The transmission is at least formed to transmit a driving motion of the second drive unit to the base at a first transmission ratio, to support beam at a second transmission ratio and to the sliding carriage at a third transmission ratio.

11 Claims, 5 Drawing Sheets

DEVICE AND METHOD FOR TRANSFERRING A COMPONENT AND TOOL SYSTEM

RELATED APPLICATIONS

This is a continuation of International Application PCT/EP2014/063865, with an international filing date of Jun. 30, 2014. The International Application PCT/EP2014/063865 claimed priority to German Patent Application 10 2013 010 804.7 filed on Jun. 30, 2013. The entire contents of the foregoing prior filed applications are hereby incorporated herein by reference.

TECHNICAL FIELD

The present invention relates to a device for transferring a component to a tool unit, a method for transferring a component from a first tool unit to a second tool unit, a controller for controlling a device for transferring a component, and a tool system for processing a component.

BACKGROUND

Press chains with linear feeders (translational linear axles) are widely known. In this context, telescopic axles are employed frequently. Because of the long travel paths, the motion can advantageously be distributed to various machine elements, and the speed of the individual components can be reduced. In this process, two support beams are shifted in equal proportion with respect to each other. The connection between the two support beams is established by means of a movable base. The base travels half the distance of the support beams. If the distances to be covered are great enough, two telescopes may be combined with each other.

SUMMARY

It is the object of the present invention to provide an improved device for transferring a component to a tool unit, an improved method for transferring a component from a first tool unit to a second tool unit, an improved controller for controlling a device for transferring a component, and an improved tool system for processing a component.

This object is achieved by a device for transferring a component, a method for transferring a component, a controller for controlling a device for transferring a component, and a tool system in accordance with the main claims.

A device for transferring a component to a tool unit, for example a press, comprises: a frame; a traversing unit with a first drive unit for moving the traversing unit with respect to the frame; and a telescopic unit with a base movable along a first travel path with respect to the traversing unit, a support beam movable along a second travel path with respect to the base, a sliding carriage for transferring the component, the sliding carriage being movable along a third travel path with respect to the support beam, a second drive unit and a transmission, the transmission being formed to transmit a driving motion of the second drive unit to the base at a first transmission ratio, to the support beam at a second transmission ratio and to the sliding carriage at a third transmission ratio, in order to move the base along the first travel path, move the support beam along the second travel path and move the sliding carriage along the third travel path, wherein at least two of the transmission ratios differ from each other.

The component may, for example, be a deformable part, for example a metal part. A frame may be a structure by means of which the device can be mounted in a stationary manner. A traversing unit may be a unit for moving the telescopic unit with respect to the frame. For example, the traversing unit may be formed as a further telescopic unit, as a swiveling unit or as an axle. An axle may be a combination of a drive unit and a mechanism. The traversing unit may be moved by a driving motion of the first drive unit. For example, a drive unit may be an electric, hydraulic or pneumatic drive. A telescopic unit may comprise several telescopic elements arranged so as to be movable relative to each other, here base, support beam and sliding carriage. The telescopic elements may be arranged so as to be movable with respect to each other via suitable rails or guides, so that the telescopic elements may perform relative movement with respect to each other. For example, the telescopic unit may also be referred to as axle, feeder, linear feeder, telescopic feeder or telescope. The travelling parts of the telescopic unit may be translational. They may be linear paths. The travel paths of the telescopic unit may be parallel with respect to each other. The driving motion of the second drive unit may be transmitted to the base, the support beam and the sliding carriage via the transmission. The transmission may comprise suitable transmission elements or gear elements, for example gears, gear racks or belts, by means of which the driving motion of the second drive unit is transmitted to the telescopic elements in the respective transmission ratios. A transmission ratio may be a gear transmission ratio or gear ratio.

At least two the travel paths may differ from each other by at least two different transmission ratios. Also, at least two traversing speeds at which the individual telescopic elements are moved may differ from each other. Since at least two of the transmission ratios differ from each other, for example, it can be determined which of the telescopic elements is leading in movement.

For example, the second transmission ratio for transmitting the driving motion to the support beam may differ from at least one of the other transmission ratios. For example, the second transmission ratio may differ from the first and/or third transmission ratio. Correspondingly, the second transmission ratio may differ from a transmission ratio of the traversing unit. Thereby, the support beam may be prevented from leading in movement, for example.

According to one embodiment, the first transmission ratio, the second transmission ratio and the third transmission ratio differ from one another. Also, the transmission ratios of the telescopic unit may differ from one or more transmission ratios of the traversing unit. In this way, a temporal course of a process of moving the device can be adjusted very accurately.

The second drive unit may be arranged on the base, for example. In this case, transmission units of the transmission which realize the second transmission ratio and the third transmission ratio may be arranged integrated in the support beam. This allows for a very space-saving arrangement.

The transmission may be formed so as to simultaneously transmit the driving motion to the base, the support beam and the sliding carriage. This way, the base, the support beam and the sliding carriage may be moved at the same time by way of the driving motion of the second drive unit.

According to an embodiment, the travel paths may be matched with one another and with a distance between the device and the at least one tool unit such that, when the traversing unit and the telescopic unit are moved as far as possible in the direction of the at least one tool unit, only the sliding carriage and a free end of the support beam project into a tool space of the at least one tool unit. The tool space may, for example, represent a space in which the component is arranged while being processed by the tool unit. For example, the tool space may be a space lying between two press elements. A state of being moved as far as possible may represent an extended position. A free end of the support beam may represent a portion of the support beam not overlapping with the base. By way of the base remaining outside the tool space, the component may already be entered into the tool space when an opening of the tool unit still is relatively narrow.

The traversing unit may be formed as a further telescopic unit having a further base movable along a further first travel path with respect to the frame, a further support beam movable along a further second travel path with respect to the further base, and a further transmission. The further transmission may be formed to transmit a further driving motion of the first drive unit to the further base at a further first transmission ratio and to the further support beam at a further second transmission ratio, in order to move the further base along the further first travel path and the further support beam along the further second travel path. The further first travel path and the first travel path as well as the further second travel path and the second travel path may differ from each other. Correspondingly, the first transmission ratio and the further first transmission ratio as well as the second transmission ratio and the further second transmission ratio may differ from each other. Using at least two telescopic units, a long total translational travel path may be realized.

A method of transferring a component from a first tool unit to a second tool unit using an aforementioned device comprises: extending the telescopic unit from a state extended in the direction of the first tool unit to a state fully extended in the direction of the second tool unit; and moving the traversing unit to a state extended in the direction of the second tool unit, while the telescopic unit is in the state fully extended in the direction of the second tool unit.

The device may be arranged between the tool units. A fully extended state may represent an extended position. For example, in the step of extending the telescopic unit, the telescopic unit may be moved from a first extended position pointing in the direction of the first tool unit to a second extended position pointing in the direction of the second tool unit. The telescopic elements of the telescopic unit may be moved continuously. By moving or completely moving the traversing unit in the direction of the second tool unit only after the telescopic unit has assumed the second extended position, idle time of the second tool unit for preventing the device from colliding with the second tool unit can be avoided or at least shortened.

The method may comprise a step of temporarily moving the traversing unit from a state extended in the direction of the first tool unit to an intermediate state. Herein, the step of temporarily moving may be executed during the step of extending the telescopic unit. In this manner, the entire traversing time for moving the component between the two tool units can be reduced.

In the step of temporarily moving the traversing unit and the step of extending the telescopic unit, a first driving motion of the first drive unit may be less than the second driving motion of the second drive unit. Thereby, a traversing speed of the telescopic unit may be greater than a traversing speed of the traversing unit, and the telescopic elements of the telescopic unit may lead in movement with respect to the elements of the traversing unit.

The traversing unit and the telescopic unit may be moved in the opposite direction in a corresponding manner. Thus, a step of extending the telescopic unit from a state extended in the direction of the second tool unit to a state fully extended in the direction of the first tool unit may be performed. In a step of moving, the traversing unit may then be moved to a state extended in the direction of the first tool unit, while the telescopic unit is in the state fully extended in the direction of the first tool unit. As an alternative, for example, the traversing unit may be moved in the direction of the first tool unit simultaneously, for example when the first tool unit already is opened sufficiently wide.

A controller for controlling an aforementioned device is formed to provide a first control signal for controlling the first driving motion of the first drive unit to a first interface to the first drive unit and a second control signal for controlling a second driving motion of the second drive unit to a second interface to the second drive unit, in order to move the traversing unit and the telescopic unit in accordance with an aforementioned method. A controller may for example be a device comprising control logic for generating the control signals. For example, a software program may be executed on means of the controller to generate the control signals. The interfaces may be realized by way of electric, pneumatic or hydraulic connectors of the drive units, for example. If the drive unit is an electric drive unit, a control signal may represent a control voltage or a control current.

A tool system for processing a component comprises: a first tool unit, particularly a first press, for performing first processing of the component; a second tool unit, particularly a second press, for performing second processing of the component; and an aforementioned device for transferring the component between the first tool unit and the first tool unit.

Thus, the approach described may advantageously be applied to a chain of presses, for example with linear feeders.

The device may be equipped with two telescopes, i.e. two parallel units of telescopic unit and traversing unit, arranged to the left and to the right of the tool. The two telescopes may be mounted to the frame. The parallel telescopes may be coupled via a shared sliding carriage or the tooling beam. Given such an arrangement, there are no issues concerning the part of the telescopes leading in movement.

As an alternative, such two parallel telescopes may also be disposed before the tool. Employing the approach described here, issues due to a part of the telescopes leading in movement can be avoided. The two telescopes may be coupled via a shared sliding carriage or the tooling beam or may not be coupled to each other. Two such units, for example arranged before the plunger of one or two opposing tools, allow for separately covering the left and right sides of the tool.

As an alternative, the device may comprise only one telescope, i.e. an entity of a telescopic unit and a traversing unit which are arranged before the tool of the tool unit, for example the plunger of a press. Before the tool can mean that the sliding carriage and at least part of the support beam guiding the sliding carriage may enter the tool space. For example, the one telescope may be arranged centrally with respect to the tool. Such a centric arrangement is cost-saving, easy to control and allows for quick transport even before the plunger. Hence, a low cost factor is achieved, and a simple controller is sufficient in comparison with two parallel telescopes, since it is not necessary to coordinate two telescopes coupled via the tooling beam.

Advantageously, in the field of press automation, the approach described enables avoiding a situation in which a support beam is leading in movement in telescopic feeders and the sliding carriage only comes to rest at the front point of the support beam in the final position. By avoiding the leading movement of the support beam, it is not necessary to wait for a tool of a tool unit to be opened sufficiently so that the support beam does not collide with the tool. Hence, the tool unit, for example a press, may not only allow for single-stroke operation, which means that the press stops at the top dead center. Since such a sequential operation of a press is not necessary for automation, the output rate is increased heavily.

Employing the approach described further facilitates compact construction of the feeder units so that they fit in the existing free space, for example between the presses. This is challenging in the case of shorter distances between presses at a constant table size, in particular.

BRIEF DESCRIPTION OF THE DRAWINGS

Embodiments of the present invention will be explained in greater detail in the following with respect to the appended drawings.

DETAILED DESCRIPTION

Figure 1:
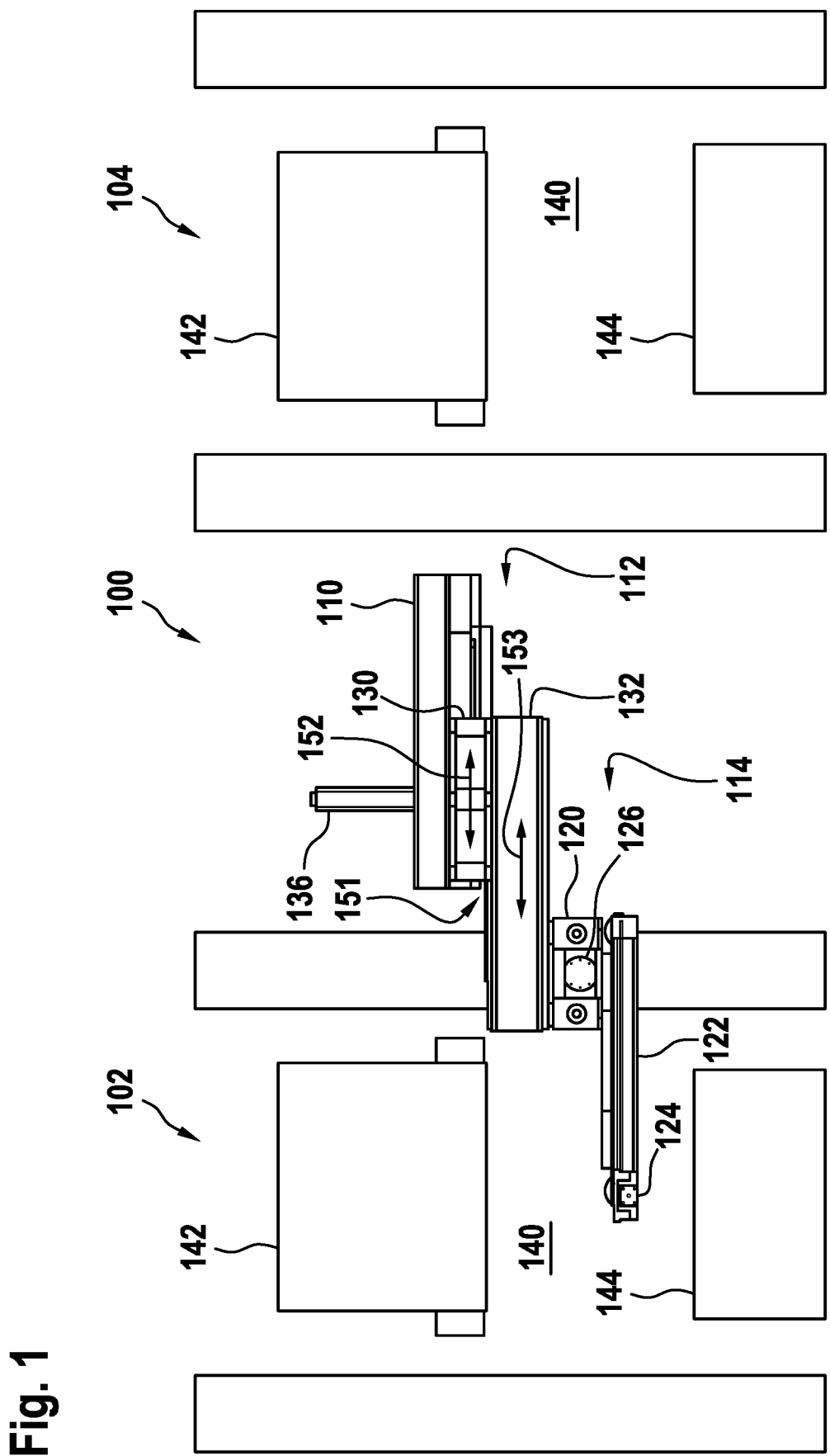
FIG. 1 an illustration of a device for transferring a component in a first motional state, according to an embodiment of the present invention.

In the following description of embodiments of the present invention, the same or similar reference numerals shall be used for similarly acting elements depicted in the various drawings, wherein repeated description of such elements shall be omitted.

FIG. 1 shows an illustration a device 100 for transferring a component in a first motional state, according to an embodiment of the present invention. The device 100 is arranged between two tool units, which are depicted as a first press 102 and a second press 104, for example.

The device 100 comprises a traversing unit 112 and a telescopic unit 114. According to this embodiment, the traversing unit 112 is also configured as a telescopic unit.

The telescopic unit 114 comprises a base 120, a support beam 122, a sliding carriage 124 and a drive unit 126. Furthermore, the telescopic unit 114 comprises a transmission whose elements can be arranged so as to be distributed to the base 120 and the support beam 122.

The base 120 is mounted to the traversing unit 112 so that the base 120 is movable along a first travel path with respect to the traversing unit 112. To this end, the base 120 is coupled to the drive unit 126 via the transmission. The support beam 122 is mounted to the base 120 so that the support beam 122 is movable along a second travel path with respect to the base 120. To this end, the support beam 122 is coupled to the drive unit 126 via the transmission. The sliding carriage 124 is mounted to the support beam 122 so that the sliding carriage 124 is movable along a third travel path with respect to the support beam 122. To this end, the sliding carriage 124 is coupled to the drive unit 126 via the transmission.

According to this embodiment, the drive unit 126 is arranged on the base 120. A drive shaft of the drive unit 126 is aligned transversely with respect to the direction of the travel paths. In the illustration of FIG. 1, the drive shaft of the drive unit 126 is aligned horizontally.

The base 120 has a rectangular housing structure.

A length of the support beam 122 may approximately correspond to 3 times a length of the base 120, each as viewed along a direction of the travel paths. A height of the support beam 122 may, for example, correspond to half the height of the base 120 or less. At least one gear belt or at least one gear rack of the transmission may be arranged in the support beam 122, for example.

The sliding carriage 124 is arranged so as to be movable along an edge of the support beam 122. The sliding carriage 124 comprises a receptacle for receiving and holding the component. The receptacle comprises an arm transversely, here horizontally, projecting from the support beam 122, for example in the form of a tooling beam.

When a driving motion of the drive unit 126 occurs, the base 120, the support beam 122 and the sliding carriage 124 move at the same time. The movements of the base 120, the support beam 122 and the sliding carriage 124 may be at different speeds due to different transmission ratios between the drive unit 126 and the base 120, the support beam 122 and the sliding carriage 124. In this way, the travel paths of the base 120, the support beam 122 and the sliding carriage 124 may be different in length.

According to this embodiment, the traversing unit 112 is configured to be a further telescopic unit having a further base 130, a further support beam 132 and a further drive unit 136. Moreover, the traversing unit 112 comprises a further transmission 151, the elements of which are arranged so as to be distributed to the further base 130 and the further support beam 132. The further base 130 is mounted to the frame 110 so that the further base 130 is movable along a further first travel path 152 with respect to the frame 110. To this end, the further base 130 is coupled to the further drive unit 136 via the further transmission 151. The further support beam 132 is mounted to the further base 130 so that the further support beam 132 is movable along a further second travel path 153 with respect to the further base 130. To this end, the further support beam 132 is coupled to the further drive unit 136 via the further transmission 151.

According to this embodiment, the further drive unit 136 is arranged on the further base 130. A driveshaft of the further drive unit 136 is aligned transversely with respect to the direction of the travel paths and transversely with respect to the drive shaft of the drive unit 126. In the illustration of FIG. 1, the driveshaft of the further drive unit 136 is aligned vertically. The further drive unit 136 is led through the frame 110. To this end, the frame 110 comprises an elongated through-hole through which a portion of the further drive unit 136 protruding from the further base 130 is led.

The further base 130 has a rectangular housing structure.

A length of the further support beam 132 may be greater than a length of the support beam 122. A height of the further support beam 132 may be greater than a height of the support beam 122.

When a driving motion of the further drive unit 136 occurs, the further base 130 and the further support beam 132 move at the same time. The movements of the further base 130 and the further support beam 132 may be at different speeds due to different transmission ratios between the further drive unit 136 and the further base 130 and the further support beam 132. In this way, the travel paths of the further base 130 and the further support beam 132 may be different in length.

The drive unit 126 and the further drive unit 136 may be controlled independently of each other. In this way, the telescopic elements 120, 122, 124 of the telescopic unit 114 may be moved, while the telescopic elements 130, 132 of the traversing unit 112 stand still, and vice versa. Moreover, the drive unit 126 and the further drive unit 136 may be controlled so as to at least temporarily perform driving motions at different speeds.

When a driving motion of the drive unit 126 and the further drive unit 136 at equal speed occurs, for example equally fast rotation of the drive shafts of the drive unit 126 and the further drive unit 136, the traversing speeds of at least one telescopic element 120, 122, 124 of the telescopic unit 114 and at least one telescopic element 130, 132 of the traversing unit 112 may differ from one another or the traversing speeds of at least one telescopic element 120, 122, 124 of the telescopic unit 114 may differ from each another, because of at least two different transmission ratios.

In FIG. 1, the device 100 is shown in a state which corresponds to an extended position facing the first press 102. Here, the telescopic elements 120, 122, 124, 130, 132 of the telescopic unit 114 and of the traversing unit 112 are moved as far as possible in the direction of the first press 102. The sliding carriage 124 is moved to an end of the support beam 122 facing the first press 102 and projects into a tool space 140 of the first press 102 together with a portion of the support beam 122 protruding beyond the base 120. The tool space 140 is arranged between two press elements 142, 144 of the first press 102. The further telescopic elements 120, 126, 130, 132, 136 are arranged outside the tool space 140. The base 120 is moved to an end of the support beam 132 facing the first press 102.

The press elements 142, 144 of the two presses 102, 104 comprise a length extending in the direction of the travel path of the sliding carriage 124 and a width extending transversely with respect to the direction of the travel path of the sliding carriage 124. According to an embodiment, the device 100 is arranged between the two presses 142, 144 so that the travel path of the sliding carriage 124 meets the tool space 140 arranged between the opened press elements 142, 144 at a position of half the width of the press elements 142, 144. The travel paths of the sliding carriage 124 and the support beam 122 of the telescopic unit 124 thus may lead approximately centrally into the tool space 140.

Figure 2:
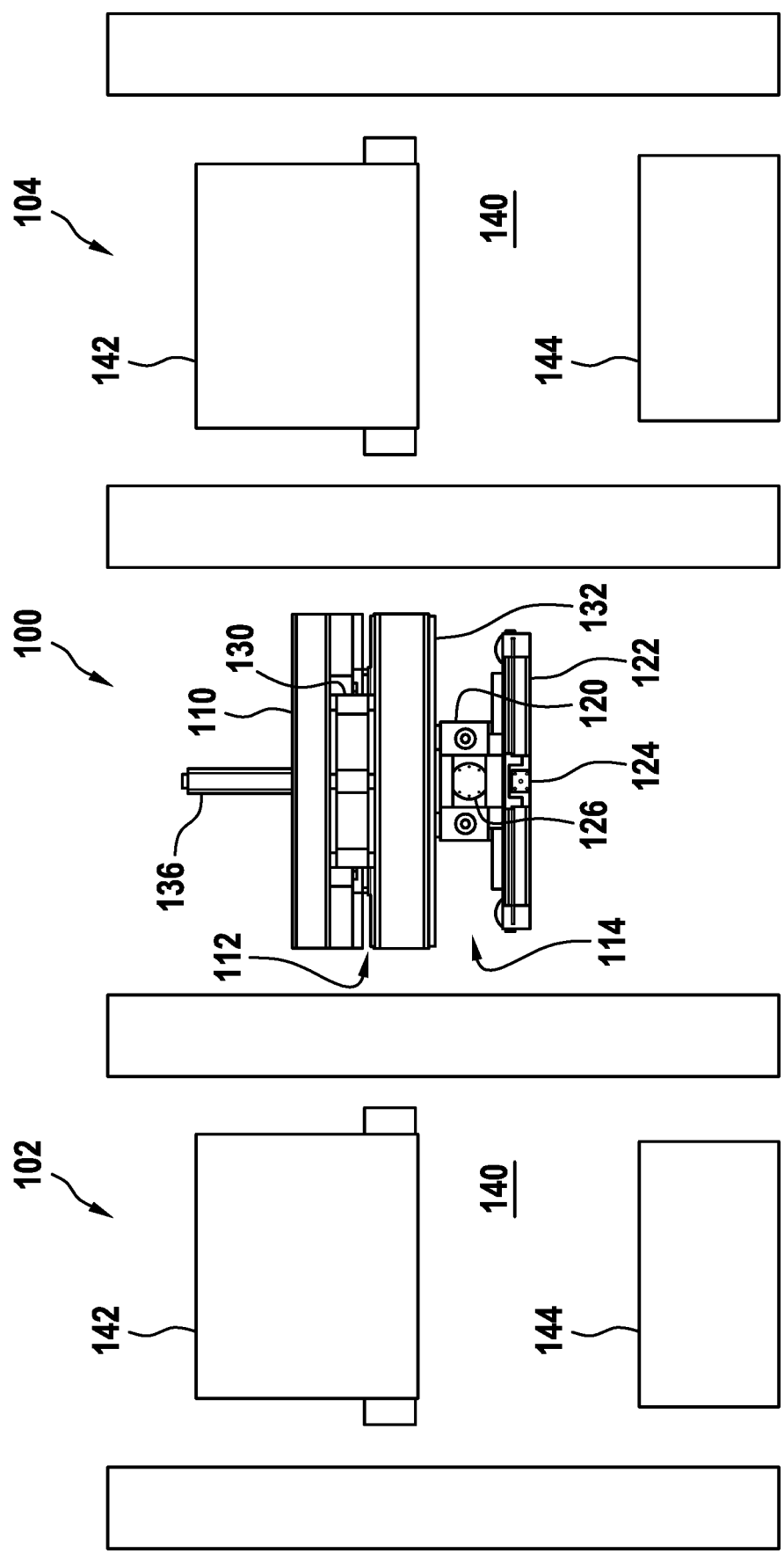
FIG. 2 an illustration of a device for transferring a component in a second motional state, according to an embodiment of the present invention.

FIG. 2 shows an illustration of a device 100 for transferring a component in a second motional state, according to an embodiment of the present invention. According to this embodiment, the device 100 corresponds to the device 100 described with reference to FIG. 1 during a transfer movement from the first press 102 to the second press 104.

In FIG. 2, the device 100 is shown in a state in which all telescopic elements 120, 122, 124, 130, 132 are halfway in the direction of the second press 104. The further base 130 is arranged centrally with respect to the frame 110, the further support beam 132 is arranged centrally with respect to the further base 130, the base 120 is arranged centrally with respect to the further support beam 132, the support beam 122 is arranged centrally with respect to the base 120, and the sliding carriage 124 is arranged centrally with respect to the support beam 122.

Figure 3:
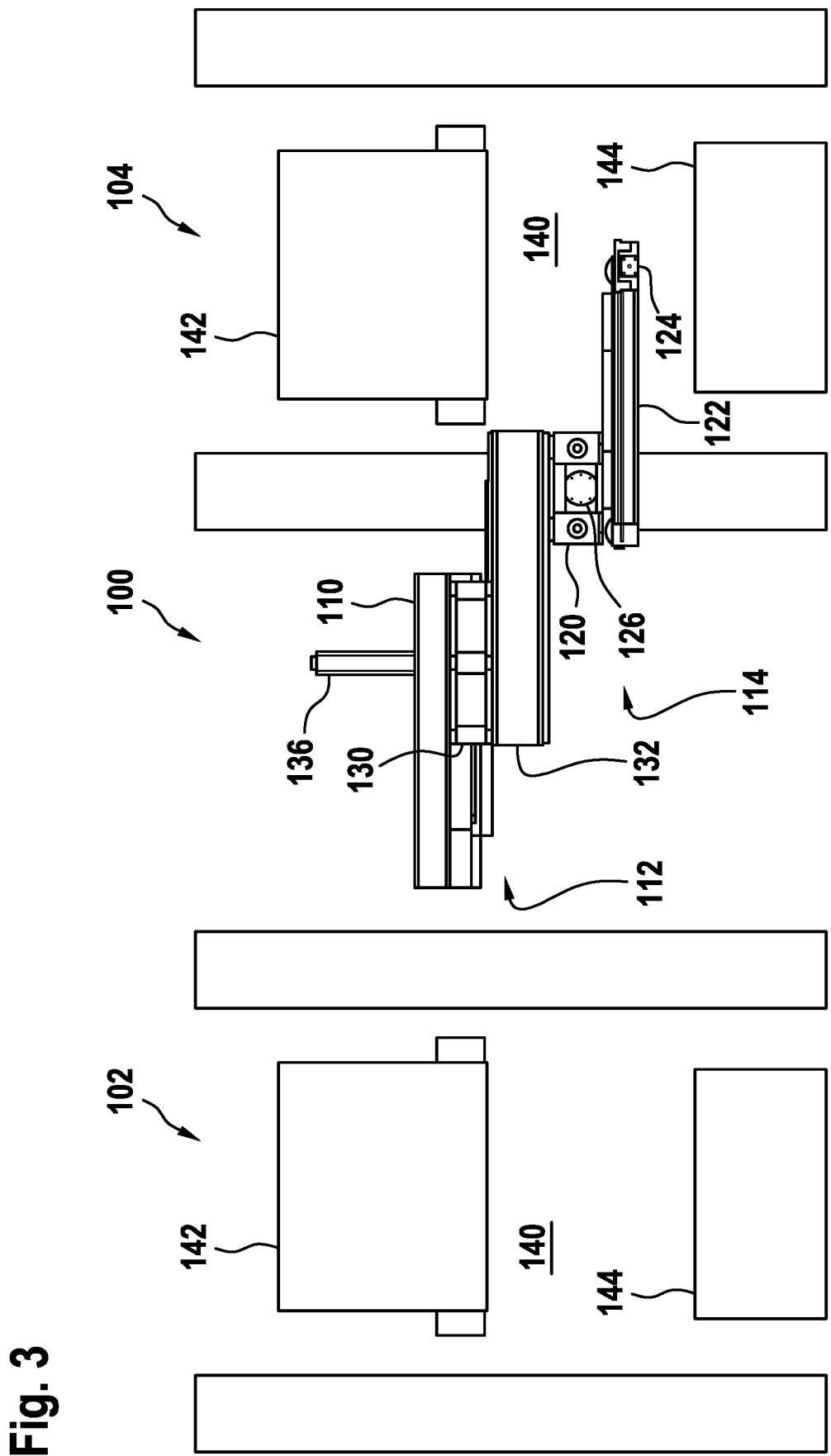
FIG. 3 an illustration of a device for transferring a component in a third motional state, according to an embodiment of the present invention.

FIG. 3 shows an illustration of a device 100 for transferring a component in a third motional state, according to an embodiment of the present invention. According to this embodiment, the device 100 corresponds to the device 100 described with reference to FIG. 1 during a transfer movement from the first press 102 to the second press 104.

In FIG. 3, the device 100 is shown in a state which corresponds to an extended position facing the second press 104. Here, the telescopic elements 120, 122, 124, 130, 132 of the telescopic unit 114 and of the traversing unit 112 are moved as far as possible in the direction of the second press 104. The sliding carriage 124 is moved to an end facing the second press 104 and projects into a tool space 140 of the second press 104 together with a portion of the support beam 122 protruding beyond the base 120. The tool space 140 is arranged between two press elements 142, 144 of the second press 104. The further telescopic elements 120, 126, 130, 132, 136 are arranged outside the tool space 140. The press elements 142, 144 of the two presses 102, 104 may be different from one other.

Figure 4:
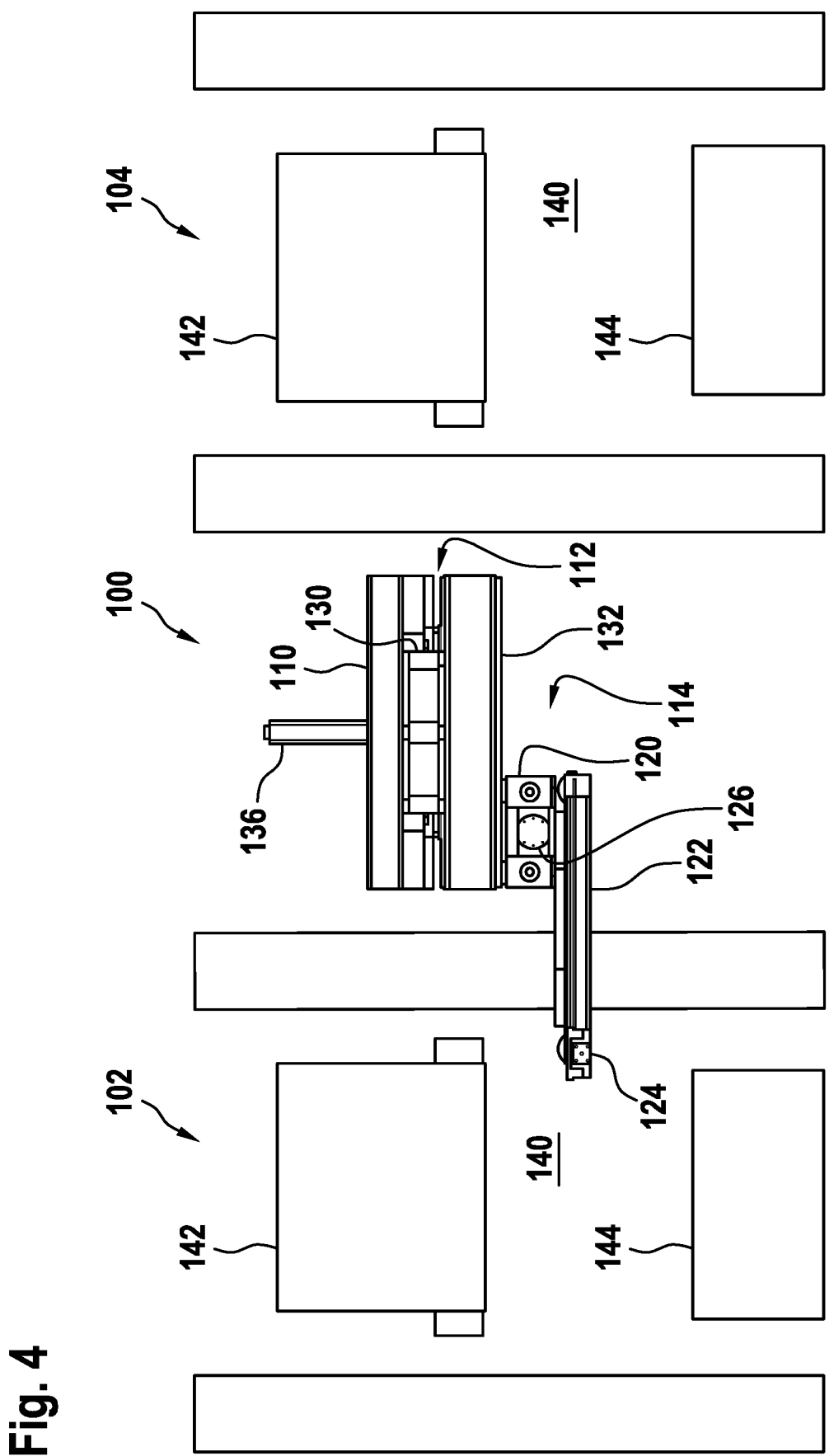
FIG. 4 an illustration of a device for transferring a component in a fourth motional state, according to an embodiment of the present invention.

FIG. 4 shows an illustration of a device for transferring a component in a fourth motional state, according to an embodiment of the present invention. According to this embodiment, the device 100 corresponds to the device 100 described with reference to FIG. 1 during a transfer movement from the second press 104 to the first press 102.

In FIG. 4, the device 100 is shown in a state in which the traversing unit 112 is in an intermediate state and the telescopic unit 114 is in an extended position facing the first press 102. Here, the further base 130 is arranged centrally with respect to the frame 110, and the further support beam 132 is arranged centrally with respect to the further base 130. The telescopic elements 120, 122, 124 of the telescopic unit 114 are moved as far as possible in the direction of the first press 102, as described with reference to FIG. 1. Hence, the first telescopic unit 114 is in an extended position facing the first press 102.

Once the telescopic unit 114 is in the extended position shown in FIG. 4, the telescopic elements 130, 132 of the traversing unit 112 may initially or further be moved in the direction of the first press. In this way, the sliding carriage 124 is leading in movement with respect to the further telescopic elements 120, 122, 130, 132. After the telescopic unit 114 has assumed the extended position shown in FIG. 4, moving the telescopic elements 130, 132 of the traversing unit 112 may begin starting from an extended position of the traversing unit 112 facing the second press 104 or starting from an intermediate position of the traversing unit 112, which need not necessarily be the central position shown in FIG. 4. According to an embodiment, the telescopic elements 130, 132 of the traversing unit 112 may be moved to the intermediate position, while the telescopic unit 114 is moved to the extended position shown in FIG. 4. The intermediate position may, for example, be located centrally or in an area at between one third and two thirds of a total travel path of the traversing unit between the presses 102, 104.

In the following, an embodiment of the present invention will be described with reference to FIGS. 1 to 4.

The embodiment is based on sequentially moving the traversing unit 112 and the telescopic unit 114 with corresponding overlapping and matching of the travel paths by way of different transmission ratios of the axles with respect to each other. Here, an axle represents a combination of drive unit 126 and the further drive unit 136 and the telescopic elements 120, 124, 126, 130, 132 driven by the drive unit 126 and the further drive unit 136, i.e. the traversing unit 112 and the telescopic unit 114.

In the direction of traverse from the first press 102 to the second press 104, as shown in FIGS. 1 to 3, both axles 112, 114 are driven synchronously, as the plunger of the second press 104 is already opened.

After the component has been transported to the second press 104, the feeder of the device 100 moves back to the first press 102. During this, the states shown in FIGS. 4, 3 and 1 are assumed. This direction, the traversing unit 112 and the telescopic unit 114 thus are driven asynchronously, as the plunger of the first press 102 is not opened yet or not opened wide enough yet. By slowing the further drive unit 136, the drive unit 126 drives the telescopic unit 114 into the extended position with the sliding carriage 124 and a tooling beam mounted to the sliding carriage 124. The traversing unit 112 only travels half the stroke. Once the tool of the first press 102 is open wide enough, the traversing unit 112 moves the sliding carriage 124 and the telescopic unit 114 into the first press 102 by means of the further drive unit 136.

By way of this optimized procedure, the freedom of movement is increased, and the automation has more time to pick and transport the components.

In the given space available between the presses 102, 104, the travel paths of the individual components 120, 122, 124, 130, 132 are matched exactly with one another. In contrast to the known telescopes, wherein the travel paths always halve, the travel paths of all machine components 120, 122, 124, 130, 132 here are matched with the space needed by the presses 102, 104 by means of different transmission ratios, in order to move only the very flat support beam 122, which is arranged at the bottom in the figures, and the sliding carriage 124 into the tool, whereas the remaining mechanical equipment remains outside the tool.

The different transmission ratios are necessary because moving the support beam 122 of the telescopic unit 114, which is arranged at the bottom here, depends on the depth of the table of the press 102, 104, whereas the other travel paths are governed by the distance between the presses 102, 104.

The depth of the table may remain constant, whereas the distances between the presses are variable, and vice versa.

Figure 5:
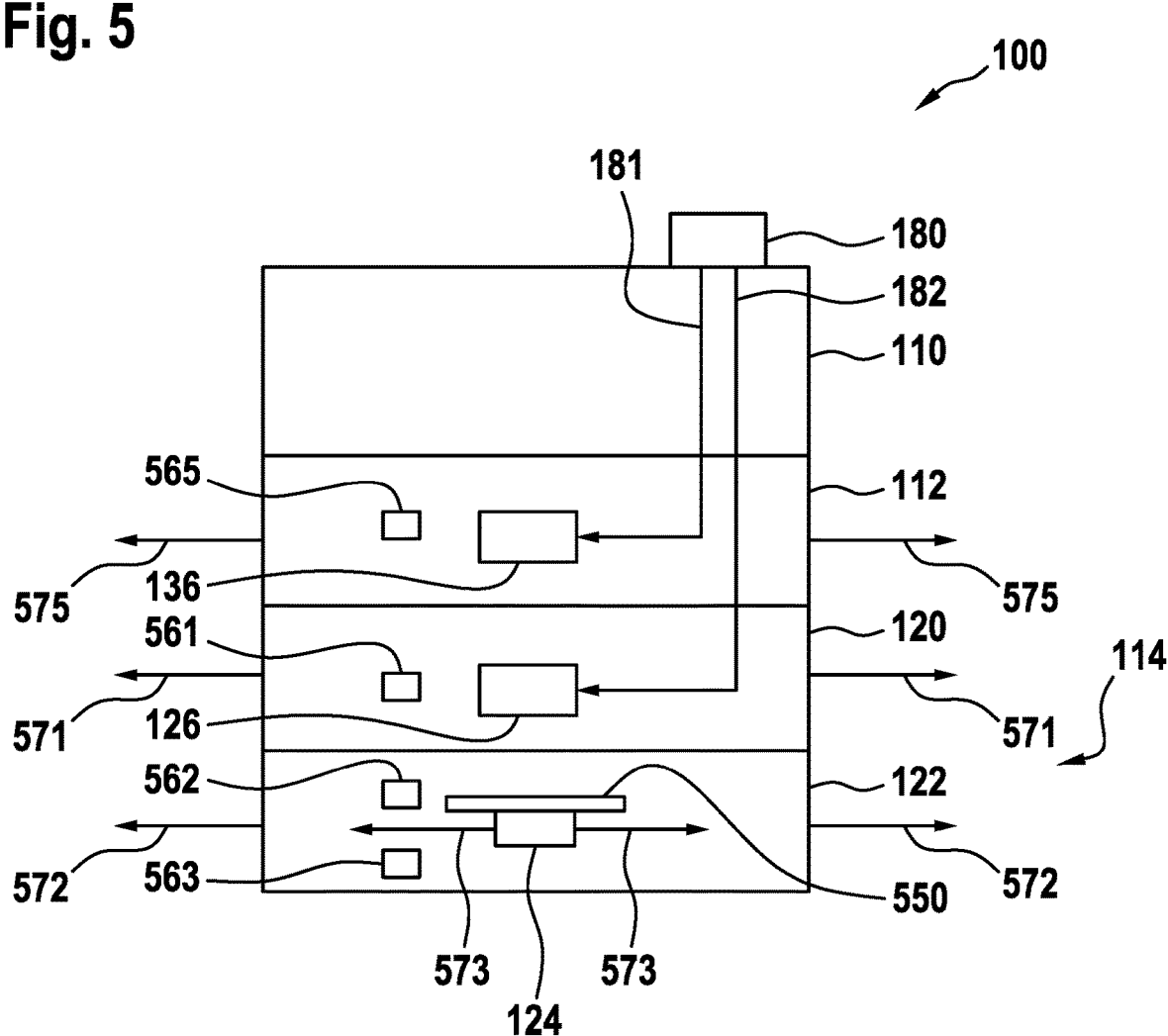
FIG. 5 a schematic illustration of a device for transferring a component, according to an embodiment of the present invention.

FIG. 5 shows a schematic illustration of a device 100 for transferring a component 550, according to an embodiment of the present invention. The device 100 may be the device 100 described on the basis of FIG. 1.

According to one embodiment, the device comprises a traversing unit 112 and a telescopic unit 114, as already described on the basis of FIG. 1. The traversing unit 112 comprises a drive unit 136, and the telescopic unit 114 comprises a drive unit 126. The telescopic unit 114 further comprises a base 120, a support beam 122 and a sliding carriage 124, which may be configured as described on the basis of FIG. 1, for example. The component 550 held by the sliding carriage 124 is shown schematically.

Furthermore, a transmission of the telescopic unit 114 is shown in a purely schematic manner in FIG. 5. The transmission comprises at least one first transmission element 561 for transmitting a driving motion of the drive unit 126 to the base 120, at least one second transmission element 562 for transmitting a driving motion of the drive unit 126 to the support beam 122, and at least one third transmission element 563 for transmitting the driving motion of the drive unit 126 to the sliding carriage 124. The transmission elements 561, 562, 563 may, for example, realize different transmission ratios each. As an alternative, the first and second transmission elements 561, 562 may realize equal transmission ratios, and the third transmission element 563 may realize a transmission ratio different therefrom, for example. As an alternative, the first and third transmission elements 561, 563 may realize equal transmission ratios, and the second transmission element 562 may realize a transmission ratio different therefrom, for example. As an alternative, the third and second transmission elements 563, 562 may realize equal transmission ratios, and the first transmission element 561 may realize a transmission ratio different therefrom, for example.

A transmission 565 of the traversing unit 112 is illustrated in a correspondingly schematic manner.

Driven by the drive unit 126, the base 120 may be moved along a first travel path 571, the support beam 122 may be moved along a second travel path 572, and the sliding carriage 124 may be moved along a third travel path 573. A sum of the travel paths 571, 572, 573 may be referred to as a total travel path of the telescopic unit 114. Driven by the further drive unit 136, the traversing unit 112 may be moved along a travel path 575. A total travel path of the device 100 may result from the sum of a total travel path of the telescopic unit 114 and a total travel path of the traversing unit 112.

By way of example, a controller 180, for example in the form of a control unit for controlling the device 100, is shown in FIG. 5. For example, the controller 180 may be formed to control the device 100 so that the device 100 can perform the traversing motions described with reference to FIG. 6.

The controller 180 is formed to generate a first control signal 181 for controlling a first driving motion of the further drive unit 136 of the traversing unit 112 and output the same to the further drive unit 136. Furthermore, the controller 180 is formed to generate a second control signal 182 for controlling a second driving motion of the drive unit 126 of the telescopic unit 114 and output the same to the drive unit 126.

The controller 180 may be part of the device 100 or arranged separately from the device 100.

As an alternative, the device 100 may be a device in which the traversing unit 112, in particular, differs from the embodiment described in FIG. 1 and is realized as an axle or a swiveling unit, for example. According to a further embodiment, the traversing unit 112 may be omitted, and the base of the telescopic unit 114 may be directly coupled to the frame 110. Also, the telescopic unit 114 may comprise a number of telescopic elements deviating from the previously described number of telescopic elements 120, 122, 124.

Moreover, the device 100 may comprise two telescope devices consisting of telescopic unit 114 and traversing unit 112, which may be configured as described, and parallel travel paths. The travel paths of such two or more telescope devices may be oriented toward a tool space of a tool unit, so that the support beams 122 of the telescopic units 114 may move into the tool space or pass in a laterally offset way with respect to the tool space, so that the support beams 122 of the telescopic unit 114 may be moved laterally past the tool space, for example.

Figure 6:
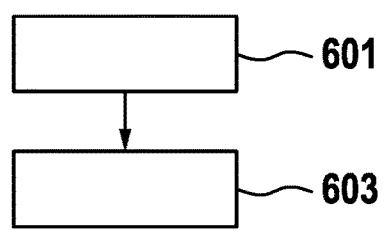
FIG. 6 a flowchart of a method for transferring a component, according to an embodiment of the present invention.

FIG. 6 shows a flowchart of a method for transferring a component from a first tool unit to a second tool unit, according to an embodiment of the present invention. The method may be executed using a device as described with reference to the preceding figures.

In a step 601, a telescopic unit of the device, as already described with reference to the preceding figures, is extended from a state extended in the direction of the first tool unit to a state fully extended in the direction of the second tool unit. Thus, the telescopic elements of the telescopic unit are moved to an extended position pointing in the direction of the second tool unit while performing the step 601. Such an extended position of the telescopic unit is shown in FIG. 4 with respect to the first press, for example.

While performing the step 601, a traversing unit of the device, as already described with reference to the preceding figures, may either be at rest or may be moved from a state extended in the direction of the first tool unit to an intermediate position lying in the direction of the second tool unit. Such an intermediate position may be at a suitable location of a total travel path of the traversing unit.

When the telescopic unit is in state fully extended in the direction of the second tool unit or in a state almost fully extended in the direction of the second tool unit, the traversing unit is extended to a state fully extended in the direction of the second tool unit in a step 603. In step 603, moving the traversing unit may be started from the intermediate position or the state extended in the direction of the first tool unit.

While performing the step 603, the telescopic unit may be at rest and only be moved through the motion of the traversing unit, or perform an extending motion still missing for reaching the completely extended position in the direction of the second tool unit.

Steps 601, 603 may be repeated in opposite directions of movement for transferring the component from the second tool unit to the first tool unit. As an alternative, for example, the traversing unit and the telescopic unit may also be moved synchronously in the direction of the second tool unit, as shown with reference to FIGS. 2 to 4.

The described embodiments are chosen to be merely exemplary and may be combined with one another. In particular, constructive details of the depicted elements of the telescopic unit and of the traversing unit may be changed.

What is claimed is:

1. A device for transferring a component between a first press and a second press, the device being arrangeable between the presses and comprising:
   a frame;
   a traversing unit with a first drive unit for moving the traversing unit with respect to the frame along a travel path in the direction of the first press and in the direction of the second press;
   a telescopic unit with:
     a base movable along a first travel path with respect to the traversing unit,
     a support beam movable along a second travel path with respect to the base, and
     a sliding carriage for transferring the component, the sliding carriage being arranged so as to be movable along an edge of the support beam and movable along a third travel path with respect to the support beam, wherein the sliding carriage is movable to an end of the support beam facing the first press to project into a tool space of the first press together with a portion of the support beam protruding beyond the base, and wherein the sliding carriage is moved to an end of the support beam facing the second press to project into a tool space of the second press together with a portion of the support beam protruding beyond the base, and
   a second drive unit and a transmission, the transmission being formed to transmit a driving motion of the second drive unit to the base at a first transmission ratio, to the support beam at a second transmission ratio and to the sliding carriage at a third transmission ratio, in order to move the base along the first travel path, move the support beam along the second travel path and move the sliding carriage along the third travel path parallel to the travel path of the traversing unit in the direction of the first press and in the direction of the second press, wherein at least two of the transmission ratios differ from each other.

2. The device of claim 1, wherein the second transmission ratio for transmitting the driving motion to the support beam differs from at least one of the other transmission ratios.

3. The device of claim 1, wherein the first transmission ratio, the second transmission ratio and the third transmission ratio differ from one another.

4. The device of claim 1, wherein the second drive unit is arranged on the base, and transmission units of the transmission which realize the second transmission ratio and the third transmission ratio are arranged so as to be integrated in the support beam.

5. The device of claim 1, wherein the transmission is formed to transmit the driving motion to the base, the support beam and the sliding carriage simultaneously.

6. The device of claim 1, wherein the travel paths are matched with each other and with a distance between the device and at least one of the presses so that only the sliding carriage and a free end of the support beam project into the tool space of the at least one press when the traversing unit and the telescopic unit are moved as far as possible toward the at least one press.

7. The device of claim 1, wherein the traversing unit is formed as a further telescopic unit with a further base movable along a further first travel path with respect to the frame, a further support beam movable along a further second travel path with respect to the further base, and a further transmission, the further transmission being formed to transmit a further driving motion of the first drive unit to the further base at a further first transmission ratio to the further support beam at a further second transmission ratio, in order to move the further base along the further first travel path and the further support beam along the further second travel path.

8. A method for transferring a component from a first tool unit to a second tool unit using the device of claim 1, the method comprising:
   extending the telescopic unit from a state extended in a direction of the first tool unit to a state fully extended in a direction of the second tool unit; and
   moving the traversing unit to a state extended in the direction of the second tool unit, while the telescopic unit is in a state fully extended in the direction of the second tool unit.

9. The method of claim 8, comprising a step of temporarily moving the traversing unit from a state extended in the direction of the first tool unit to an intermediate state, wherein the step of temporarily moving is executed during the step of extending the telescopic unit.

10. The method of claim 9, wherein a first driving motion of a first drive unit is less than a second driving motion of a second drive unit in the step of temporarily moving the traversing unit and the step of extending the telescopic unit.

11. A tool system for processing a component, the tool system comprising:
- a first tool unit, particularly a first press, for performing first processing of the component;
- a second tool unit, particularly a second press, for performing second processing of the component; and
- a device for transferring the component between the first press and the second press, the device being arrangeable between the presses and comprising:
- a frame,
- a traversing unit with a first drive unit for moving the traversing unit with respect to the frame along a travel path in the direction of the first press and in the direction of the second press,
- a telescopic unit with
    - a base movable along a first travel path with respect to the traversing unit,
    - a support beam movable along a second travel path with respect to the base, and
    - a sliding carriage for transferring the component, the sliding carriage being arranged so as to be moveable along an edge of the support beam and movable along a third travel path with respect to the support beam, wherein the sliding carriage is moveable to an end of the support beam facing the first press to project into a tool space of the first press together with a portion of the support beam protruding beyond the base, and wherein the sliding carriage is moved to an end of the support beam facing the second press to project into a tool space of the second press together with a portion of the support beam protruding beyond the base; and
- a second drive unit and a transmission, the transmission being formed to transmit a driving motion of the second drive unit to the base at a first transmission ratio, to the support beam at a second transmission ratio and to the sliding carriage at a third transmission ratio, in order to move the base along the first travel path, move the support beam along the second travel path and move the sliding carriage along the third travel path parallel to the travel path of the traversing unit in the direction of the first press and in the direction of the second press, wherein at least two of the transmission ratios differ from each other.

* * * * *